US007267833B2

(12) United States Patent
Shon et al.

(10) Patent No.: US 7,267,833 B2
(45) **Date of Patent: *Sep. 11, 2007**

(54) APPARATUS AND METHOD OF AUTOMATIC COOKING OF BUCKWHEAT

(75) Inventors: Jong-Chull Shon, Suwon (KR); Boris V. Rayskiy, Suwon (KR); Tai Eun Kim, Suwon (KR)

(73) Assignee: Samsung Electronics Co., Ltd., Suwon-Si (KR)

(*) Notice: Subject to any disclaimer, the term of this patent is extended or adjusted under 35 U.S.C. 154(b) by 407 days.

This patent is subject to a terminal disclaimer.

(21) Appl. No.: 10/397,248

(22) Filed: Mar. 27, 2003

(65) Prior Publication Data

US 2004/0103794 A1 Jun. 3, 2004

(30) Foreign Application Priority Data

Dec. 2, 2002 (KR) ..................... 10-2002-0075786

(51) Int. Cl.
*A23L 3/01* (2006.01)

(52) U.S. Cl. ...................... 426/233; 426/243; 426/618; 426/523; 99/331; 99/332; 99/333; 99/451; 219/702; 219/707; 219/719

(58) Field of Classification Search ................ 426/231, 426/233, 237, 241–243, 508, 509, 510, 618, 426/523; 219/702, 707, 709, 719; 99/451, 99/331–333

See application file for complete search history.

(56) References Cited

U.S. PATENT DOCUMENTS 4,791,263 A * 12/1988 Groeschel, Jr. ............. 219/707
5,876,778 A * 3/1999 Stewart ...................... 426/508
6,083,539 A 7/2000 Yamada et al. ............... 426/28

(Continued)

FOREIGN PATENT DOCUMENTS

EP 817533 A1 1/1998
JP 2001-0275588 A * 10/2001
WO WO 01/01733 A1 1/2001

OTHER PUBLICATIONS http://web.archive.org/web/20011225050840/sharpusa.com/products/TypeLanding/0,1056,10,00.html, SharpUSA, 2001, Sharp Electronics Corp.*

(Continued)

*Primary Examiner*—Drew Becker
(74) *Attorney, Agent, or Firm*—Staas & Halsey LLP

(57) ABSTRACT

An apparatus and a method automatically cook food, for example, a hulled grain such as buckwheat, thereby conveniently providing the uniform and optimal cooking quality of the food to a user. The cooking apparatus includes a cooking cavity that contains food to be cooked and water therein, and a heating unit that heats the food and the water. The cooking apparatus further includes a control unit operated in such a way as to heat the food and the water at a preset initial output of the heating unit, first to reduce the output of the heating unit to a first reduced output and allow the heated high temperature water to be absorbed into the food after a first preset time has elapsed, and second, to reduce the output of the heating unit to a second reduced output and cook an inside of the food using the high temperature water absorbed into the food after the water has simmered.

25 Claims, 5 Drawing Sheets

U.S. PATENT DOCUMENTS

| | | | | |
|---|---|---|---|---|
| 6,791,070 | B2 * | 9/2004 | Kim | 219/707 |
| 6,867,403 | B2 * | 3/2005 | Shon et al. | 219/707 |
| 2003/0031766 | A1 * | 2/2003 | Lee et al. | 426/231 |

OTHER PUBLICATIONS

NIST Chemistry Webbook. http://webbook.nist.gov/cgi/cbook.cgi?Name=water&Units=SI&cTC=on.*

Beans cooking times and directions. http://recipes.chef2chef.net/recipe-archive/54/287527.shtml. Chef 2 Chef.*

NIST Chemistry Webbook. http://webbook.nist.gov/cgi/cbook.cgi?Name=water&Units=SI&cTC=on, date N.A.*

Beans cooking times and directions. http://recipes.chef2chef.net/recipe-archive/54/287527.shtml. Chef 2 Chef, date N.A.*

* cited by examiner

FIG. 3

| QUANTITY | BLOWING TIME | BOILING | | SIMMERING | | | STEAMING STAGE | |
|---|---|---|---|---|---|---|---|---|
| | | OUTPUT($P_1$) | TIME($T_1$) | OUTPUT($P_f$) | COEFFICIENT($\rho$) | MAXIMUM $T_f$ | OUTPUT($P_e$) | END TIME ($T_e$) |
| QUANTITY FOR ONE PERSON | 0:50 | 900W (MAXIMUM) | 1:10 | 500W | 0.75 | 3:00 | 300W | 15:10 |
| QUANTITY FOR TWO PERSON | | | 2:15 | | 0.80 | 6:00 | | 22:15 |
| QUANTITY FOR THREE PERSON | | | 4:30 | | | | | 22:30 |
| QUANTITY FOR FOUR PERSON | | | | | | 7:00 | | 24:30 |

APPARATUS AND METHOD OF AUTOMATIC COOKING OF BUCKWHEAT

CROSS-REFERENCE TO RELATED APPLICATIONS

This application claims the benefit of Korean Patent Application No. 2002-75786, filed Dec. 2, 2002, in the Korean Intellectual Property Office, the disclosure of which is incorporated herein by reference.

BACKGROUND OF THE INVENTION

1. Field of the Invention

The present invention relates, in general, to an apparatus and a method of automatic cooking, and, more particularly, to an apparatus and a method of automatic cooking of food using an automatic cooking algorithm.

2. Description of the Related Art

A basic method of cooking buckwheat, which is a type of hulled grain, is to put buckwheat and a proper amount of water in a vessel, and steam the buckwheat by heating the vessel. If heat is directly applied to the vessel that contains the buckwheat and the water, the heat is transmitted through the vessel, so the water contained in the vessel is boiled. While the water is boiling, the buckwheat is cooked to become edible. However, if the buckwheat is heated at an extremely high temperature for a long time during cooking, an optimal cooking quality of the buckwheat may not be obtained. Accordingly, the cooking of the buckwheat should be carried out while heating power is reduced in stages in order to obtain a satisfactory cooking quality of the buckwheat. Additionally, a cooking result depends on respective durations of the cooking stages.

When buckwheat is cooked, a gas/electric equipment, such as a cooking top, is generally used to heat a vessel containing the buckwheat. Notwithstanding that the cooking quality of the buckwheat depends on the precise control of applied heating power and cooking time for which the buckwheat is cooked, the cooking of the buckwheat is carried out depending on the judgment of a cook, so the optimal and uniform cooking quality of the buckwheat is not easily obtained. Additionally, a cook should control heating power and ascertain the cooking state of the buckwheat while standing by beside the cooking equipment, so the cook may not do other things until cooking is terminated. That is, the cook may not effectively manage the cooking time of the buckwheat.

SUMMARY OF THE INVENTION

Accordingly, it is an aspect of the present invention to provide an apparatus and a method of automatic cooking, which automatically cook buckwheat, thus conveniently providing the uniform and optimal cooking quality of buckwheat to a user.

Additional aspects and/or advantages of the invention will be set forth in part in the description which follows and, in part, will be obvious from the description, or may be learned by practice of the invention.

The foregoing and other aspects of the present invention are achieved by providing an apparatus of automatic cooking, including a cooking cavity that contains food to be cooked and water therein, a heating unit that heats the food and the water, and a control unit operated to heat the food and the water at a preset initial output of the heating unit, first, to reduce the output of the heating unit and allow the heated high temperature water to be absorbed into the food after a first preset time has elapsed, and second, to reduce the output of the heating unit and cook an inside of the food using the high temperature water absorbed into the food after the water has simmered.

Additionally, the foregoing and other aspects of the present invention are achieved by providing an apparatus of automatic cooking, including a cooking cavity that contains food to be cooked and water therein, a heating unit that heats the food and the water, a gas sensor that detects properties of air inside the cooking cavity, and a control unit operated to heat the food and the water at a preset initial output of the heating unit, first, to reduce the output of the heating unit, allow the heated high temperature water to be absorbed into the food, and obtain an output of the gas sensor after a first preset time has elapsed, and second, to reduce the output of the heating unit and cook an inside of the food using the high temperature water absorbed into the food when the output of the gas sensor reaches a preset value.

The foregoing and/or other aspects of the present invention are achieved by providing a method of automatic cooking using a cooking apparatus, the cooking apparatus having a cooking cavity that contains food to be cooked and water therein, and a heating unit that heats the food and the water, including heating the food and the water at a preset initial output of the heating unit, first, reducing the output of the heating unit and allowing the heated high temperature water to be absorbed into the food after a first preset time has elapsed, and second, reducing the output of the heating unit and cooking an inside of the food using the high temperature water absorbed into the food after the water has simmered.

Additionally, the foregoing and/or other aspects of the present invention are achieved by providing a method of automatic cooking using a cooking apparatus, the cooking apparatus having a cooking cavity that contains food to be cooked and water therein, a heating unit that heats the food and the water, and a gas sensor that detects properties of air inside the cooking cavity, including heating the food and the water at a preset initial output of the heating unit, first, reducing the output of the heating unit, allowing the heated high temperature water to be absorbed into the food and the water, and obtaining an output of the gas sensor after a first preset time has elapsed, and second, reducing the output of the heating unit and cooking an inside of the food using the high temperature water absorbed into the food when the output of the gas sensor reaches a preset value.

BRIEF DESCRIPTION OF THE DRAWINGS

These and/or other aspects and advantages of the invention will become apparent and more readily appreciated from the following description of the preferred embodiment, taken in conjunction with the accompanying drawings of which:

FIG. 3 is a table illustrating the cooking characteristics of buckwheat using the microwave shown in FIG. 1;

DETAILED DESCRIPTION OF THE PREFERRED EMBODIMENTS

Figure 1:
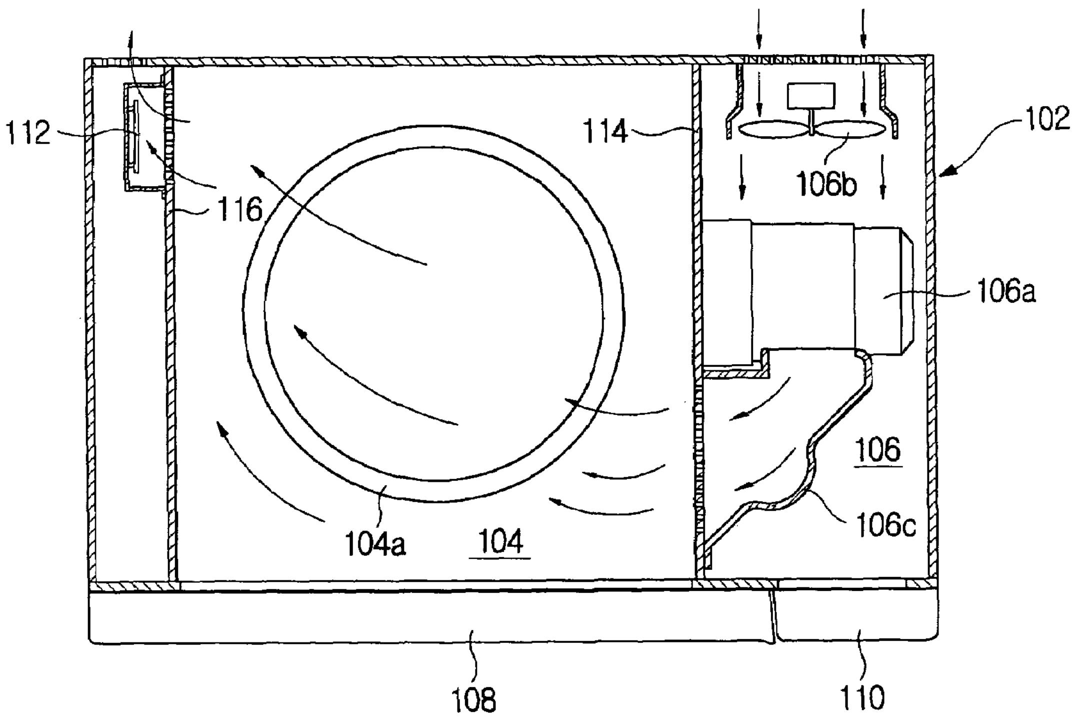
FIG. 1 is a sectional view of a microwave oven in accordance with an embodiment of the present invention.

Reference will now be made in detail to the present preferred embodiments of the present invention, examples of which are illustrated in the accompanying drawings, wherein like reference numerals refer to the like elements throughout. The embodiments are described below in order to explain the present invention by referring to the figures.

An apparatus and a method is provided to implement automatic cooking in accordance with an embodiment of the present invention, with reference to the accompanying drawings FIGS. 1 to 5. FIG. 1 is a sectional view of a microwave oven in accordance with an embodiment of the present invention. As shown in FIG. 1, a body 102 of a microwave oven is divided into a cooking cavity 104 and a machine room 106 separated from each other by a partition wall 114. A control panel 110 and a door 108 are positioned in front of the body 102.

A cooking tray 104*a* is disposed to be rotatable in the lower part of the cooking cavity 104, and food to be cooked is put on the cooking tray 104*a*. A space 118 separated from the cooking cavity 104 by a partition wall 116 is positioned opposite to the machine room 106. In the space 118, a gas sensor 112 is disposed to detect specific properties of air inside the cooking cavity 104. In an embodiment of the present invention, the gas sensor 112 is used to detect the amount of moisture contained in the air inside the cooking cavity 104 and output a voltage signal S that is inversely proportional to the amount of the moisture contained in the air.

The machine room 106 includes a magnetron 106*a*, a cooling fan 106*b* and an air duct 106*c*. The magnetron 106*a* generates microwaves. The cooling fan 106*b* cools the magnetron 106*a* by sucking external air. The air sucked through the cooling fan 106*b* is supplied to the cooking cavity 104 through the air duct 106*c* of the machine room 106. The air passed through the cooking cavity 104 is discharged from the body 102 while passing the gas sensor 112.

Figure 2:
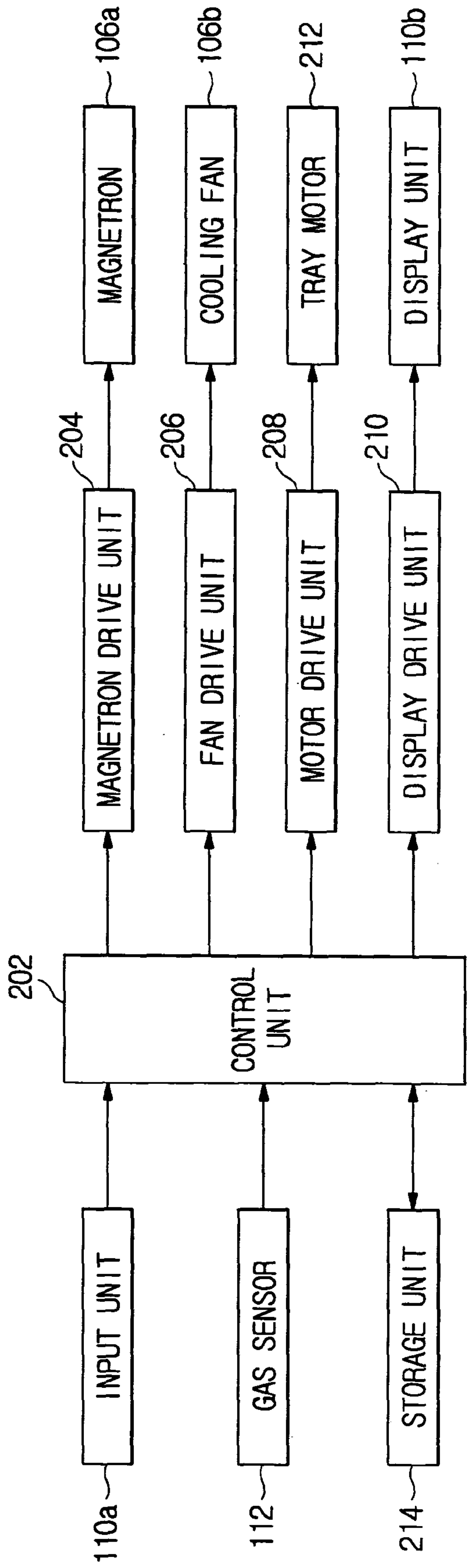
FIG. 2 is a control block diagram of the microwave oven shown in FIG. 1.

FIG. 2 is a control block diagram of the microwave oven shown in FIG. 1. As shown in FIG. 2, a control unit 202 is connected at its input terminals to an input unit 110*a*, the gas sensor 112, and a storage unit 214. The input unit 110*a* is typically positioned in the control panel 110 shown in FIG. 1. A user selects or inputs cooking conditions, sets values, etc., through the input unit 110*a*. The storage unit 214 stores programs, cooking data etc., that are required to control the overall operation of the microwave oven. For example, the cooking data include data on the respective outputs of the magnetron 106*a* and respective cooking times of cooking stages that are required to cook buckwheat. The control unit 202 allows the buckwheat to be cooked automatically by determining the outputs of the magnetron 106*a* and the cooking times with reference to the cooking data stored in the storage unit 214.

The control unit 202 is connected at its output terminals to a magnetron drive unit 204, a fan drive unit 206, a motor drive unit 208 and a display drive unit 210 that drive the magnetron 106*a*, the cooling fan 106*b*, a tray motor 212 and a display unit 110*b*, respectively. The tray motor 212 rotates a tray 104*a* disposed in the cooking cavity 104. The display unit 110*b* is positioned on the control panel 110 shown in FIG. 1, and displays cooking conditions, set values, cooking progressing state, etc., that are inputted by a user.

In order to implement the apparatus and the method of automatic cooking of the present invention, the cooking data of the buckwheat required to obtain the optimal and uniform cooking quality of the buckwheat are obtained by ascertaining the properties of the buckwheat and executing cooking tests under various conditions. If the buckwheat is heated at a high temperature for a short time, the insides of buckwheat grains are not sufficiently cooked and the surfaces of the buckwheat grains are damaged. Accordingly, water should be heated enough to be boiled at the start of the cooking of the buckwheat. Thereafter, when the water is boiled, the buckwheat should be cooked for a sufficient time so that the heated water is absorbed into the buckwheat grains while heating power is being reduced. In order to obtain the optimal cooking quality of the buckwheat, appropriate heating power and cooking time, as described below, should be controlled in each of the cooking stages.

The cooking stages of the buckwheat are divided into a boiling stage, a simmering stage, and a steaming stage to cook boiled buckwheat thoroughly, and appropriate heating power and cooking times are set in each of the cooking stages. In order to cook the buckwheat, the boiling stage is first carried out, in which water is boiled by heating a vessel that contains the water and the buckwheat. After the water is boiled, the simmering stage is carried out, in which the heating power is reduced to prevent the boiled water from overflowing outside the vessel, while the reduced heating power is maintained for a predetermined time to simmer the water sufficiently, so that high temperature water is sufficiently absorbed into the insides of the buckwheat grains. When the simmering stage is completed, the steaming stage is carried out, in which the heating power is further reduced, and the buckwheat is cooked for a time sufficient for the insides of the buckwheat grains to be completely cooked by the high temperature water absorbed into the insides of the buckwheat grains. That is, the surfaces of the buckwheat grains are heated and cooked in the simmering stage, and the insides of the buckwheat grains are heated and cooked in the steaming stage.

Cooking characteristics of the buckwheat described above are shown in FIGS. 3 and 4. FIG. 3 is a table of the cooking characteristics of the buckwheat in accordance with an embodiment of the present invention, which illustrates the outputs of the magnetron 106*a* and cooking times needed in the cooking stages according to the quantity of the buckwheat to be cooked. To carry out automatic cooking of the buckwheat according to an embodiment of the present invention, an initial stage in which an initial output $S_0$ of the gas sensor 112 is calculated is performed before the magnetron 106*a* is operated. That is, the cooking time of the simmering stage depends on the amount of moisture generated in the simmering stage in the automatic cooking of the buckwheat according to the present invention. An end time point of the simmering stage is determined on the basis of the ratio of the current output S of the gas sensor 112 to the initial output $S_0$ of the gas sensor 112. In the initial stage, to obtain the initial output $S_0$ of the gas sensor 112, moisture inside the cooking cavity 104 is minimized by blowing external air into the cooking cavity 104 for a predetermined time, for example, 50 seconds, and circulating the air using the cooling fan 106*b* of the machine room 106. When the blowing of the air is completed, the initial output $S_0$ of the gas sensor 112 is obtained.

Horny projections exist on the surfaces of the buckwheat grains, so water should be heated to a high temperature at the start of the cooking stages so that the water is absorbed into the insides of the horny projections in order to cook the buckwheat sufficiently. Accordingly, the output $P_1$ of the magnetron 106*a* is maximized so that the water is boiled as quickly as possible in the boiling stage of the buckwheat cooking. As shown in FIG. 3, the maximum output of the magnetron 106*a* is 900 W. If the maximum output of the magnetron 106*a* is 1000 W, the boiling stage may be carried out at the output of 1000 W. The cooking time of the boiling stage is from 1 minute and 10 seconds to 4 minutes and 30 seconds according to the quantity of the buckwheat. If the quantity of the buckwheat corresponds to a quantity for one person, the boiling stage is continued for 1 minute and 10 seconds, while if the quantity of the buckwheat corresponds to a quantity for two persons, the boiling stage is continued for 2 minutes and 15 seconds. Further, if the quantity of the buckwheat corresponds to a quantity for three and four persons, the boiling stage is continued for 4 minutes and 30 seconds.

If the boiling stage is completed, the output of the magnetron 106*a* is first reduced, and then the simmering stage is carried out. In this case, a first reduced output is more than 55% of the output of the boiling stage. The cooking time of the simmering stage ranges from a time point of the current output S of the gas sensor 112 to a time point of the initial output $S_0$ of the gas sensor 112. The ratio $S/S_0$ may be greater than a preset coefficient ρ, that is, $S/S_0>\rho$. The coefficient ρ has different values according to the quantity of the buckwheat to be cooked when the automatic cooking of the buckwheat is carried out. The coefficient ρ is less than 0.77 if the quantity of the buckwheat corresponds to the quantity for one person, while the coefficient ρ is equal to or greater than 0.77 if the quantity of the buckwheat corresponds to the quantity for two or more persons. In the table shown in FIG. 3, the coefficient ρ is 0.75 if the quantity of the buckwheat corresponds to a quantity for one person, while the coefficient ρ is 0.80 if the quantity of the buckwheat corresponds to a quantity for two to four persons. That is, if the current output S of the gas sensor 112 is equal to or less than 75% and 80% of the initial output $S_0$ of the gas sensor 112, the simmering stage is terminated. Further, if the current output S of the gas sensor 112 is reduced to be equal to or less than a preset value ϕ, the simmering stage may be automatically terminated. The preset value ϕ may be changed according to the characteristics and type of the gas sensor 112, or may be set to a value which may limit the cooking time of the simmering stage to an optimal time obtained by cooking tests regardless of a kind of the gas sensor being used. However, when equipment malfunction, such as the wrong operation of the gas sensor 112, occurs, the cooking time $T_f$ of the simmering stage is limited to a maximum of 3 to 7 minutes in order to prevent the cooking time from overextending. The cooking time $T_f$ is about twice the cooking time of the boiling stage.

In the steaming stage, the output of the magnetron 106*a* is reduced to be more than 55% of the output of the simmering stage regardless of the quantity of the buckwheat to be cooked. The buckwheat is heated until a total cooking time reaches 15 minutes and 10 seconds to 24 minutes and 30 seconds, depending on the quantity of the buckwheat. In the steaming stage, the insides of the buckwheat grains are completely cooked. However, since a heat transfer rate is gradually decreased in the insides of the buckwheat grains, the insides of the buckwheat grains are allowed to be cooked sufficiently by reducing the output of the magnetron 106*a* in the steaming stage and increasing the cooking time of the steaming stage. The cooking time of the steaming stage is set to be equal to or greater than twice the cooking time of the boiling and simmering stages. As shown in FIG. 3, the total cooking time according to the quantity of the buckwheat is 15 minutes and 10 seconds, 22 minutes and 15 seconds, 22 minutes and 30 seconds, and 24 minutes and 30 seconds in the case where the quantity of the buckwheat corresponds to the quantity for one person, two persons, three and four persons, respectively. Accordingly, it will be appreciated that the steaming stage of the automatic cooking of the buckwheat is carried out for the remaining time obtained by subtracting the cooking time of the boiling and simmering stages from the total cooking time. Alternatively, the cooking time of the steaming stage may be set to a preset time when the boiling stage is carried out for a preset cooking time.

Figure 4:
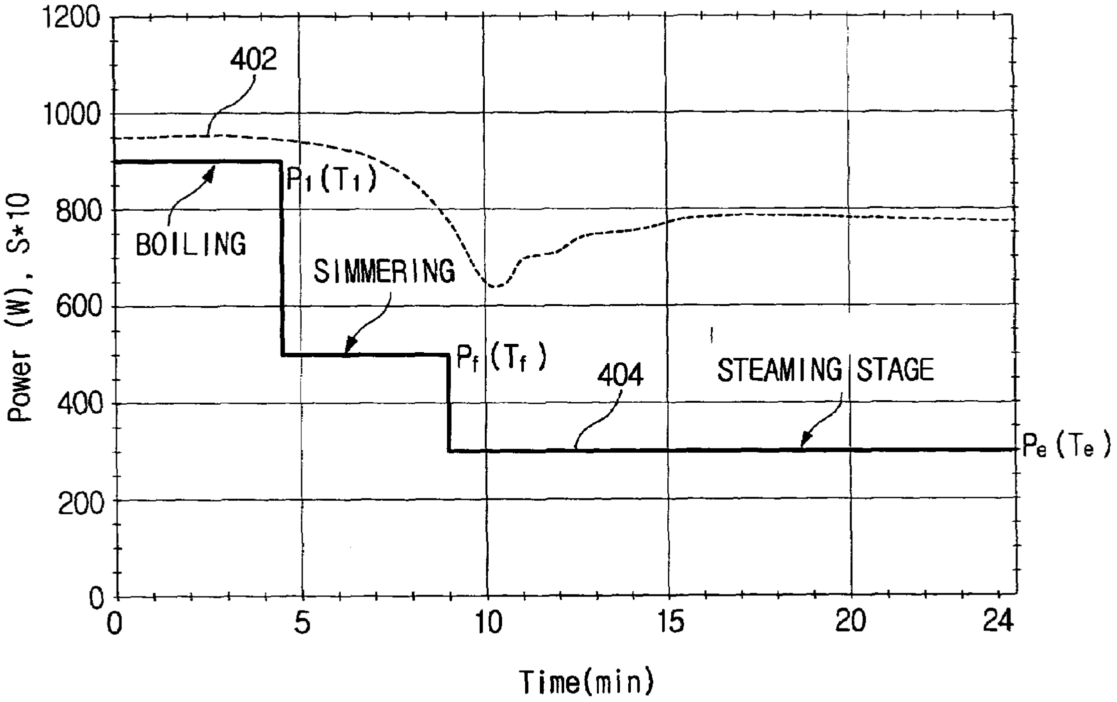
FIG. 4 is a graph illustrating an example of a cooking algorithm of the buckwheat using the microwave oven shown in FIG. 1.

FIG. 4 is a graph of a cooking algorithm of the buckwheat of the microwave oven, in accordance with an embodiment of the present invention, which illustrates a case in which buckwheat is cooked for four persons. A characteristic curve 402 represents the output of the gas sensor 112, that is, the voltage of the gas sensor 112, and the characteristic curve 404 represents the output P of the magnetron 106*a* and the cooking time T of the buckwheat. In the FIG. 4, the boiling stage to cook the buckwheat for four persons is carried out at the output of 900 W, which is maximum power, for about 4 minutes and 30 seconds. After the boiling stage is completed, the simmering stage is carried out for about 4 minutes and 30 seconds. At the time point where 4 minutes and 30 seconds elapses after the boiling stage has been completed, that is, the start of the steaming stage, the current output S is reduced by 80% of the initial output $S_0$. After the boiling stage is completed, the simmering stage is directly carried out at the output of 500 W for 4 minutes and 30 seconds. Subsequently, the steaming stage is carried out at the output of 300 W until the total cooking time reaches 24 minutes and 30 seconds. That is, in the case of the buckwheat cooking shown in FIG. 4, since the boiling and simmering stages are each carried out for 4 minutes and 30 seconds, respectively, the steaming stage is carried out for 15 minutes and 30 seconds, and therefore the total cooking time is 24 minutes and 30 seconds.

Figure 5:
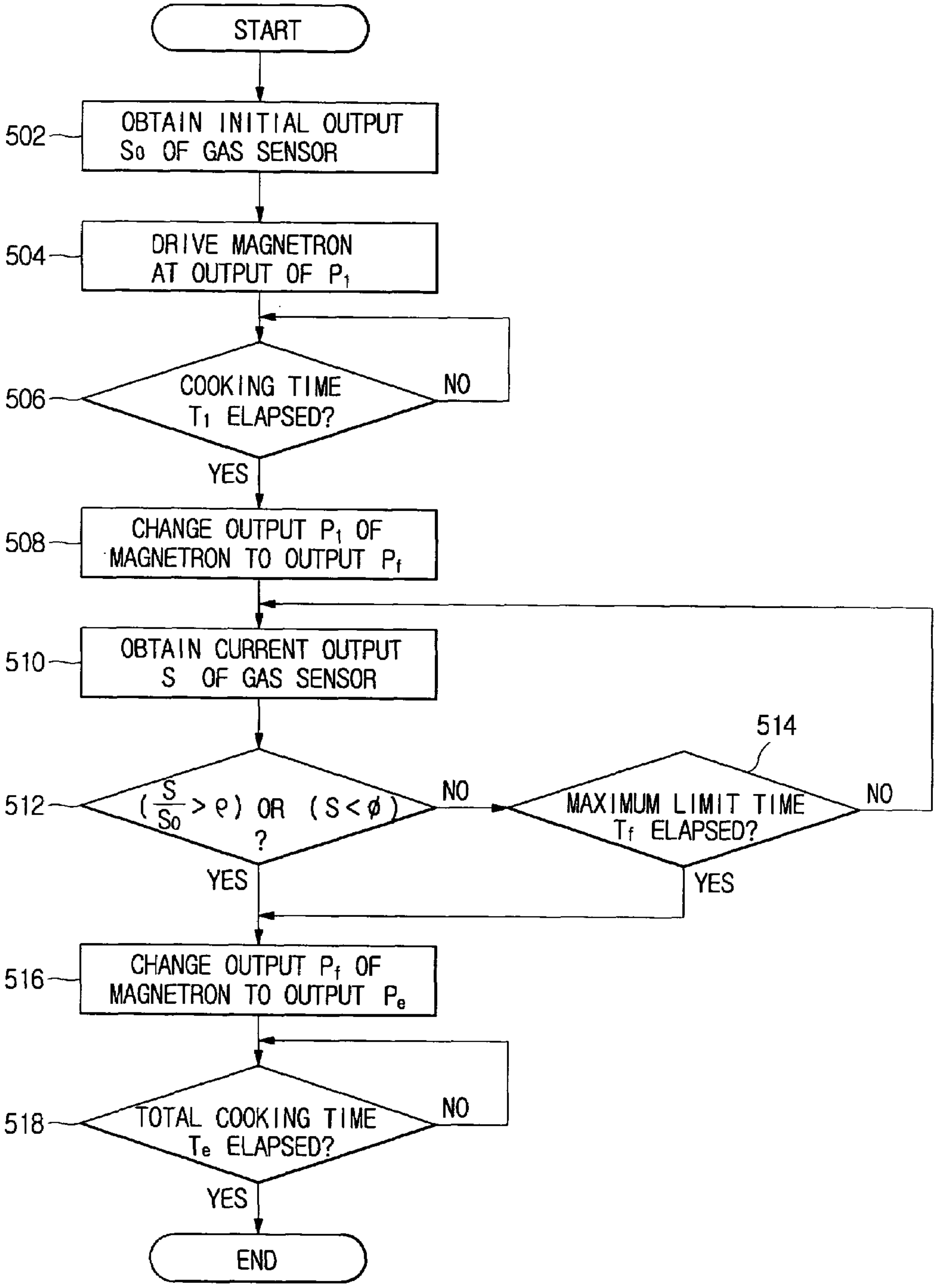
FIG. 5 is a flowchart of a method of cooking buckwheat using the microwave oven shown in FIG. 1.

FIG. 5 is a flowchart of a method of cooking buckwheat using the microwave oven shown in FIG. 1. As shown in FIG. 5, after moisture inside the cooking cavity 104 is minimized by blowing air into the cooking cavity 104 of the microwave oven, the initial output $S_0$ of the gas sensor 112 is obtained in operation 502. Thereafter, the boiling stage is carried out at the output $P_1$ of the magnetron 106*a* in operation 504. If the preset cooking time $T_1$ of the boiling stage elapses in operation 506, the simmering stage is carried out at an output $P_f$ after the output $P_1$ of the magnetron 106*a* is changed to the output $P_1$ in operation 508. The current output S of the gas sensor 112 is obtained for the simmering stage in operation 510. It Is determined whether $S/S_0$ is greater than π or S is less than ϕ, that is, $S/S_0>$ or $S<\phi$ in operation 512. If $S/S_0>\phi$ or $S<\phi$, the steaming stage is carried out at an output $P_e$ after the output of the magnetron is changed to the output $P_e$ in operation 516. To the contrary, if $S/S_0\leqq\pi$ or $S\geqq\phi$, it is determined whether the maximum time limit $T_f$ of the simmering stage has elapsed in operation 514. If the maximum time limit $T_f$ has not elapsed, the operation 510 of obtaining the current output S of the gas sensor 112 is repeated, while if the maximum time limit $T_f$ has elapsed, the steaming stage is carried out at the output $P_e$ after the output of the magnetron 106*a* is changed to the output $P_e$ in operation 516. Thereafter, it is determined whether a preset total cooking time $T_e$ has elapsed in operation 518. If the preset total cooking time $T_e$ has elapsed, the cooking of the buckwheat is terminated. The output $P_1$ greater than the output $P_f$ and the output $P_e$ is less than the output $P_1$ and the output $P_f$ in this instance.

As is apparent from the above description, the present invention provides an apparatus and a method of automatic cooking, which cook buckwheat according to an automatic cooking algorithm, thus providing a uniform and optimal cooking quality of the buckwheat when cooking of buckwheat.

In one embodiment, the output of the heating unit is reduced to the second reduced output if the current output of the gas sensor is equal to or less than 77% of the initial output of the gas sensor.

Although a few preferred embodiments of the present invention have been shown and described, it would be appreciated by those skilled in the art that changes may be made in these embodiments without departing from the principles and spirit of the invention, the scope of which is defined in the claims and their equivalents.

What is claimed is:

1. An automatic buckwheat cooking apparatus, comprising:
- a cooking cavity that contains buckwheat to be cooked and water therein;
- a heating unit that heats the buckwheat and the water;
- a gas sensor that detects properties of air inside the cooking cavity; and
- a heat, simmer, steam control unit operated to automatically cook the buckwheat, a cooking time of a simmering stage depending on an amount of moisture generated in the simmering stage, and wherein the heat, simmer, steam control unit is arranged to control the heating unit to:
  - heat the buckwheat and the water to boiling at an initial output of the heating unit for a first preset time,
  - obtain an output of the gas sensor after the first preset time has elapsed,
  - simmer the buckwheat and water at a first reduced output that is approximately 75% or 80% of the initial output for a period of about twice the first preset time or a maximum of about seven minutes, allowing heated temperature water to be absorbed into the buckwheat, and
  - reduce the output of the heating unit to a second reduced output that is approximately 60% of the first reduced output and cook an inside of the buckwheat using the heated temperature water absorbed into the buckwheat when the output of the gas sensor reaches a preset value,
- wherein the output of the heating unit is reduced to the second reduced output if a current output of the gas sensor is equal to or less than 77% of an initial output of the gas sensor, and
- a uniform and optimal cooking quality of buckwheat is provided.

2. The apparatus as set forth in claim 1, wherein moisture inside the cooking cavity is minimized by circulating the air inside the cooking cavity to obtain the initial output of the gas sensor.

3. The apparatus as set forth in claim 2, further comprising a blowing unit that circulates the air inside the cooking cavity, wherein the heating unit is cooled by the blowing unit when the heating unit is operated.

4. The apparatus as set forth in claim 1, wherein the output of the gas sensor is a voltage level that is inversely proportional to the moisture inside the cooking cavity.

5. The apparatus as set forth in claim 1, wherein the control unit terminates cooking of the buckwheat when a second preset time has elapsed after the output of the heating unit is reduced to the second reduced output.

6. The apparatus as set forth in claim 5, wherein a total cooking time is previously set according to an amount of the buckwheat, and an end time point of the second preset time is limited to an end time point of the total cooking time.

7. The apparatus as set forth in claim 5, wherein the second preset time is greater than twice a time ranging from a starting of cooking to a time point at which the output of the heating unit is reduced to the second reduced output.

8. A method of automatic buckwheat cooking using a cooking apparatus, the cooking apparatus having a cooking cavity that contains buckwheat to be cooked and water therein, and a heating unit that heats the buckwheat and the water, the method comprising:
- heating the buckwheat and the water at a preset initial output of the heating unit for a first preset time;
- reducing, in a simmering stage, the output of the heating unit to a first reduced output that is approximately 75% or 80% of the initial output for a period of about twice the first preset time or a maximum of about seven minutes, the period depending on an amount of moisture generated in the simmering stage, and allowing the heated temperature water to be absorbed into the buckwheat; reducing the output of the heating unit to a second reduced output that is 60% of the first reduced output and cooking an inside of the buckwheat using the heated temperature water absorbed into the buckwheat, and providing a uniform and optimal cooking quality of buckwheat.

9. The method as set forth in claim 8, wherein the heating unit is a high frequency generation unit.

10. The method as set forth in claim 8, wherein the heating unit is a high frequency generation unit, an initial maximum output of the high frequency generation unit is 900 W, the first reduced output of the high frequency generation unit is 675 or 720 W, and the second reduced output of the high frequency generation unit is 405 or 576 W.

11. A method of automatic buckwheat cooking using a cooking apparatus, the cooking apparatus having a cooking cavity that contains buckwheat to be cooked and water therein, a heating unit that heats the buckwheat and the water, and a gas sensor that detects properties of air inside the cooking cavity, comprising:
- heating the buckwheat and the water at a preset initial output of the heating unit;
- reducing, in a simmering stage, the output of the heating unit to a first reduced output that is approximately 75% or 80% of the initial output for a period of about twice the first preset time or a maximum of about seven minutes, the period depending on an amount of moisture generated in the simmering stage,
- allowing heated temperature water to be absorbed into the buckwheat and obtaining an output of the gas sensor; and
- reducing the output of the heating unit to a second reduced output that is approximately 60% of the first reduced output and cooking an inside of the buckwheat using the heated temperature water absorbed into the buckwheat when the output of the gas sensor reaches a preset value,
- wherein the output of the heating unit is reduced to the second reduced output if the current output of the gas sensor is equal to or less than 77% of the initial output of the gas sensor.

12. The method as set forth in claim 11, further including minimizing moisture inside the cooking cavity by circulating the air inside the cooking cavity to obtain the initial output of the gas sensor.

13. The method as set forth in claim 12, further including using a blowing unit to circulate the air inside the cooking cavity and to cool the heating unit when the heating unit is operated.

14. The method as set forth in claim 11, wherein the output of the gas sensor is a voltage level that is inversely proportional to an amount of moisture inside the cooking cavity.

15. The method as set forth in claim 11, further including terminating cooking of the buckwheat when a second preset time has elapsed after the output of the heating unit is reduced to the second reduced output.

16. The method as set forth in claim 15, further including previously setting a total cooking time according to an amount of the buckwheat and limiting an end time point of the second preset time to an end time point of the total cooking time.

17. The method as set forth in claim 15, further including setting the second preset time to more than twice a time ranging from a starting of cooking to a time point at which the output of the heating unit is reduced to the second reduced output.

18. A method of automatic buckwheat cooking using a microwave oven having a cooking cavity that contains the buckwheat to be cooked and water therein, wherein the microwave oven heats the buckwheat and the water, and a gas sensor detects properties of air inside the cooking cavity, comprising:

heating the buckwheat and the water at a preset initial microwave output;

reducing, in a simmering stage, the output of the microwave oven to a first reduced output that is approximately 75% or 80% of the initial output for a period of about twice the first preset time or a maximum of about seven minutes, the period depending on an amount of moisture generated in the simmering stage, allowing heated temperature water to be absorbed into the buckwheat and obtaining an output of the gas sensor after a first preset time has elapsed; and second, reducing the output of the microwave oven to a second reduced output that is approximately 60% of the first reduced output and cooking an inside of the buckwheat using the heated temperature water absorbed into the buckwheat when the output of the gas sensor reaches a preset value, wherein the output of the microwave oven is reduced to the second reduced output if the current output of the gas sensor is equal to or less than 77% of the initial output of the gas sensor.

19. The method as set forth in claim 18, wherein an initial output of the gas sensor is obtained before the buckwheat and the water are heated, a current output of the gas sensor is obtained when the buckwheat and the water are heated, and the output of the microwave oven is reduced to the second reduced output if a ratio of the current output of the gas senor to the initial output of the gas sensor reaches a preset value.

20. The method as set forth in claim 18, further including minimizing moisture inside the cooking cavity by circulating the air inside the cooking cavity to obtain the initial output of the gas sensor.

21. The method as set forth in claim 20, further including using a blowing unit to circulate the air inside the cooking cavity and to cool the microwave oven when the microwave oven is operated.

22. The method as set forth in claim 18, wherein the output of the gas sensor is a voltage level that is inversely proportional to an amount of moisture inside the cooking cavity.

23. The method as set forth in claim 20, further including terminating cooking of the buckwheat when a second preset time has elapsed after the output of the microwave oven is reduced to the second reduced output.

24. The method as set forth in claim 23, further including previously setting a total cooking time according to an amount of the buckwheat, and limiting an end time point of the second preset time to an end time point of the total cooking time.

25. The method as set forth in claim 23, further including setting the second preset time to more than twice a time ranging from a starting of cooking to a time point at which the output of the microwave oven is reduced to the second reduced output.

* * * * *

UNITED STATES PATENT AND TRADEMARK OFFICE

CERTIFICATE OF CORRECTION

PATENT NO. : 7,267,833 B2
APPLICATION NO. : 10/397248
DATED : September 11, 2007
INVENTOR(S) : Jong-Chull Shon et al.

It is certified that error appears in the above-identified patent and that said Letters Patent is hereby corrected as shown below:

Column 10, Line 11, Claim 19, change “senor” to --sensor--.

Signed and Sealed this

Fifteenth Day of April, 2008

JON W. DUDAS
*Director of the United States Patent and Trademark Office*